3,245,939
PROCESS FOR THE PREPARATION OF CATION-ACTIVE POLYMER DISPERSIONS
Eduard Bergmeister and Joseph Heckmaier, Burghausen, Upper Bavaria, Germany, assignors to Wacker-Chemie G.m.b.H., Munich, Germany, a firm of Germany
No Drawing. Filed Nov. 19, 1963, Ser. No. 324,860
Claims priority, application Germany, Nov. 30, 1962, W 33,445
8 Claims. (Cl. 260—29.6)

The present invention relates to an improvement in the process of preparing stable, cation-active polymer dispersions by the process of polymerization in the presence of an aqueous solution of a water soluble salt of a polymer prepared from the reaction product of a secondary amine with the epoxide of an unsaturated polymerizable epoxide compound. The cation-active polymer dispersions are polymer dispersions with positively charged polymer particles.

It is well known that the commercial aqueous polymer dispersions are prepared by using anion active and/or non-ionic emulsifiers or protective colloids. The polymer particles of the dispersions always have a negative charge in the first case, and in the second case—because of the concurrent use of anionic emulsifiers—they often have a negative charge. On the other hand, there are many materials, such as glass and mineral substances, for example, glass wool and rock wool, textile fibers, wood fibers or cellulose, which also have a negative charge in the presence of water. The impregnation of such materials with aqueous synthetic resin dispersions is therefore difficult because of the identity of the charge. Adherence is often insufficient, and a complete adsorption must be brought about by the addition of coagulating agents, such as alum or an acid. However, in many instances, such as in the manufacture of paper, this is undesirable because the acid reaction is not wanted.

Many attempts have been made therefore to prepare cation-active polymer dispersions. However, it has been found that cation-active, micelle-forming emulsifiers, generally yield very unstable dispersions. The dispersions break down upon dilution by virtue of the change of charge, and their shelf stability is completely inadequate. It has been suggested that an improvement in stability can be achieved by selection of special cationic emulsifiers, but such stable, cation-active polymer dispersions have heretofore not appeared on the market.

It has been further suggested for achieving stable cation-active polymer dispersions to polymerize an unsaturated quaternary ammonium compound directly into the polymer by means of copolymerization. However, the inclusion or emulsifying groups into the polymer has the disadvantage that the films produced therefrom always remain sensitive to water.

It has further been suggested to use homo- or copolymers of esters of acrylic acid or α-alkylacrylic acid with amino-alcohols of the general formula $$R^5R^6N—(CR^3R^4)_x—C(R^1R^2)—OH$$

($R^1$ to $R^6$=H, alkyl under $C_8$, aralkyl, cycloalkyl; $x$=0 to 3), such as poly (diethylaminoethyl methacrylate) or its quaternary compound, as a cation-active protective colloid. While dispersions with distinctly improved properties can be achieved therewith as against the use of cation-active, micelle-forming emulsifiers, the stability and especially the shelf life of the polymer dispersions are also inadequate in this case.

It is an object of the present invention to prepare stable, cation-active polymer dispersions.

Another object of the inevntion is the development of an improved process of producing a stable, cation-active polymer dispersion by heating a mixture of water and a monomer selected from the group consisting of ethylenically-unsaturated polymerizable compounds and mixtures thereof in the presence of a free-radical forming polymerization catalyst, cationic dispersion agent and, as a protective colloid, an aqueous solution of a water-soluble salt of a polymer prepared from the reaction product of a secondary amine with the epoxide of an unsaturated polymerizable epoxide compound.

A further object of the invention is the obtention of a protective colloid solution adaptable for the preparation of stable, cation-active polymer dispersions, said cationic emulsifier solution comprising an aqueous solution of a water-soluble salt of a polymer prepared from the reaction product of a secondary amine with the epoxide of an unsaturated polymerizable epoxide compound.

These and other objects of the invention will become more apparent as the description thereof proceeds.

We have now found that cation active dispersions with excellent stability can be obtained from ethylenically-unsaturated polymerizable monomers and their mixtures by so-called free-radical emulsion polymerization or co-polymerization in the presence of free-radical forming polymerization catalysts, cationic dispersion agents or emulsifiers and cationic protective colloids if, for the protective colloid, an aqueous solution of a water-soluble salt of a polymer prepared from the reaction product of an unsaturated, polymerizable epoxide compound with secondary amines and especially reaction products containing secondary amino-alcohols of the following formula:

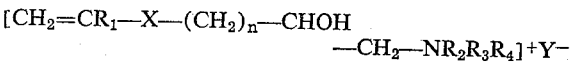
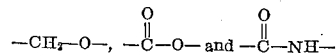

wherein X is a linkage selected from the group consisting of $$—CH_2—O—,\quad —\overset{O}{\underset{\|}{C}}—O—\text{ and }—\overset{O}{\underset{\|}{C}}—NH—$$

$R_1$ is a member selected from the group consisting of hydrogen and alkyl; $R_2$ and $R_3$ can be different and are members selected from the group consisting of alkyl, aryl, aralkyl, cycloalkyl and hydroxyalkyl; $R_4$ is a member selected from the group consisting of hydrogen, alkyl and glycidyl; Y is an anion and $n$ is an integer from 1 to 2. Preferably the alkyl group in each instance is a lower alkyl such as methyl, ethyl or propyl; the aryl group is phenyl; the aralkyl group is phenyl-lower alkyl, such as the benzyl group; the cycloalkyl group contains from 5 to 6 carbon atoms such as the cyclohexyl group; the hydroxyalkyl group contains from 2 to 7 carbon atoms, such as hydroxyethyl; and the anion is a member selected from the group of anions of strong mineral acids, anions of weak mineral acids and anions of lower alkanoic acids; preferably the anions are those of phosphoric, formic or acetic acid.

For the reaction with the epoxy compounds, the employment of secondary amines or amino-alcohols is preferred, so that di- or trisubstiuted amines will not be formed which would lead to cross-linking during polymerization. Among the secondary amines are preferably amines of the formula

where $R_2$ and $R_3$ have the above-assigned values.

Suitable examples of starting materials for the preparation of the protective colloids used in accordance with the present invention are, among others, the following unsaturated, polymerizable epoxide compounds: glycidyl acrylate and glycidyl methacrylate, vinyl epoxystearate, allyl glycidylethers, allyl-phenyl glycidylethers, and the like. Preferably we utilize epoxide compounds of the formula

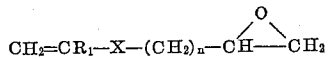

wherein $R_1$, X and $n$ have the above-assigned values. Among these compounds it is further preferable to utilize compounds of the formula

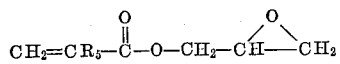

and

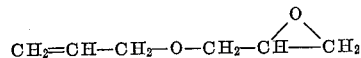

where $R_5$ is a member of the group consisting of hydrogen, methyl and phenyl. Examples of suitable secondary amines, as defined above, are dialkylamines, such as dimethyl- and diethylamines, as well as higher secondary amines, such as methyl-laurylamine, alkylarylamines, diarylamines and dicycloalkylamines. Preferred secondary amino-alcohols are primarily diethanolamine, methylethanolamine and their homologs.

The reaction of the epoxide compounds with secondary amines or secondary amino-alcohols may be performed pursuant to known methods. For example, 1 mol of glycidyl methacrylate is added dropwise accompanied by stirring at 30–40° C. to 1 mol of the secondary amine, possibly in the presence of small amounts of water, and the mixture is stirred for 4–5 hours at the same temperature until no epoxide groups can be found in a sample. The reaction products may, as such, be used directly for the subsequent polymerization. However, they may also be previously quaternarized pursuant to known methods, for instance, by reaction with dimethylsulfate, alkylhalides or epichlorohydrin. In this way the cation active character of the protective colloids formed therefrom and thus the adsorption properties as well as the antistatic properties may be still further improved.

The polymerization into cationic protective colloids of the monomeric reaction products thus obtained of the condensation of the epoxide compounds with the amines or amino-alcohols is preferably carried out in aqueous solution. For homopolymerization the monomers are diluted to about 5–20% with water, preferably adjusted to neutral reaction or to acid reaction of a pH of about 3 to 6 with an acid and polymerized with a water-soluble peroxide, such as hydrogen peroxide and potassium persulfate, or with a water-soluble redox system, such as an alkali metal persulfate-sulfite or tertiarybutylhydroperoxide-formaldehydesulfoxylate, under customary conditions such as at about 30–90° C., preferably until a polymerization degree of 100 to 2000 is reached.

It is well known that the stability of dispersions partially depends upon the ratio of the hydrophilic groups to the lipophilic groups in the emulsifier or protective colloid. Therefore, depending upon the polarity of the monomers which are used for the preparation of the dispersions, it is advantageous also to vary the protective colloid of the invention with respect to the ratios of hydrophilic groups to lipophilic groups. This may be accomplished in various ways.

By using secondary amino-alcohols as the secondary amine in the condensation reaction, the hydrophilic property of the protective colloid is increased. Similarly the hydrophilic property of the protective colloid is increased to the same extent by copolymerization of the polymerizable condensation product obtained from a secondary amine with hydrophilic, water-soluble monomers, such as vinylpyrrolidone or acrylamide, methacrylamide, and the reaction products of these amides with formaldehyde. On the other hand, the lipophilic aspects of the protective colloid can be increased by copolymerization of the condensation product obtained from either a secondary amine or a secondary aminoalcohol with hydrophobic monomers, such as vinylesters, vinylchloride, acrylic esters, higher vinylethers or styrene. Up to 70% of the hydrophilic mixed monomers may be used and up to about 30% of the lipophilic monomers, but it should be taken into consideration that the ratio of hydrophilic or lipophilic monomers to the monomeric secondary amino-alcohol reaction product should be chosen such that the resultant copolymers should still be water-soluble as salts. Otherwise, the copolymerization is carried out in a manner analogous to the homopolymerization in an aqueous medium.

As previously mentioned, the polymerizable amine reaction product is preferably neutralized with an acid prior to the polymerization. In addition to the strong mineral acids, weak acids such as phosphoric acid, formic acid or acetic acid are particularly suitable for this purpose. However, the neutralization may also be effected after polymerization of the reaction product into the protective colloid in the event that the polymerization is to take place in the alkaline medium.

The cationic protective colloid solutions thus obtained are used directly for the emulsion polymerization of the ethylenically unsaturated monomers, where about 0.5% to 10%, preferably 0.5% to 3% by weight, of cation protective colloid is used based on the total weight of dispersion.

In addition to the cationic protective colloid of the invention, about 0.05 to about 1% by weight based on the total weight of the dispersion, of a cationic dispersion agent, either an emulsifier or wetting agent, is added to the polymerization mixture. The cationic dispersion agent can be any of the known materials, such as a salt of a fatty amine or an oxyethylated fatty amine, preferably a surfactive ammonium or pyridinium salt; preferred are quaternary ammonium salts, such as dodecyltrimethyl ammonium bromide or alkyldimethylbenzyl ammonium chloride, known as the commercial product "Zephirol," or the commercial product "Germocid."

Non-ionic dispersing agents (emulsifiers), may also be used concurrently. Examples of nonionic dispersing agents which may be used are polyoxyethylene-polyoxypropylene (9:1 to 1:9)-glycols having a molecular weight of 1000–12,000; alkyl- or alkylarylpolyglycol derivatives, such as polyglycolmonoethers of higher fatty alcohols, for instance, polyethyleneglycol-monoethers (with 10–20 glycoloxide radicals) with oleyl alcohol; polyglycolmonoesters of higher fatty acids, such as the reaction product of ethyleneoxide or polyethyleneglycol (with 10–20 glycoloxide radicals) with oleic acid; partial esters of polyhydric alcohols with higher fatty-or rosin-acids, such as glycerinmonostearate or sorbitan trioleate; or esters or partial esters of higher fatty- or rosin-acids with polygylcolethers of polyvalent alcohols, such as the tristearate of sorbitanpolyglycolether or the hexaoleate of sorbitolglycolether, where the polyglycol moiety is derived from a condensation product of ethylene oxide or propylene oxide or mixtures thereof.

Instead of or in addition to the non-ionic dispersion agents, non-ionic protective colloids such as polyvinylalcohol, which may contain up to 40 mol-percent of acetyl groups, may be added as well as methyl- or hydroxyethyl cellulose, namely, in an amount of about 0.1 to 5 preferably 0.5 to 2% by weight, of the polymerization mixture.

The present invention may generally be used for the free radical polymerization of all unsaturated organic compounds which are insoluble or only sparsely soluble in water and which are generally polymerizable in aqueous emulsions. Such unsaturated organic compounds may be monoolefins or conjugated diolefins or their mixtures and derivatives. The polymerizable monomers are compounds which contain a $CH_2=C<$ group wherein at least one of the free valences is attached to an electronegative group, that is, a group which essentially increases the electrical asymmetry or the polar character of the molecule. Examples of such monomers are: arylolefins, particularly vinyl benzenes such as styrene, α-methylstyrene, 2-vinyltoluene, divinylbenzene, p-chlorostyrene, and dichlorostyrene; α-methylenecarboxylic acids, such as acrylic acid and methacrylic acid and their esters, nitriles and amides, for instance, the alkyl esters such as methyl-, ethyl-, propyl-, butyl-, isobutyl-, 2-ethylhexyl-, cyclohexyl- and decyl-esters of acrylic acid and methacrylic acid, acrylonitrile, methacrylonitrile, vinylidenecyanide, acrylamide and methacrylamide as well as N-substituted acryl- and methacrylamides; halogenated ethylenes, such as vinylchloride and vinylidenechloride; vinylesters, particularly with alkanoic, alkanedioic, and benzene carboxylic acids having from one to 18 carbon atoms, such as vinyl acetate, vinyl propionate, vinyl laurate, vinyl stearate and vinyl benzoate; allyl- and isopropenylesters, particularly with alkanoic acids, alkanedioic acids and benzene carboxylic acids having from 1 to 18 carbon atoms, such as their acetates; alkylvinylethers, such as methylvinylether; alkylvinylketones, such as methylvinylketone; α-, β- and γ-vinylpyridines, N-vinylcarbazol, and the like. Other polymerizable unsaturated hydrocarbons which may be used are alkenes, such as ethylene and propylene, as well as conjugated dienes, preferably 1, 3-dienes, as butadiene, isoprene, 1- and 2-chlorobutadiene, etc.

For the preparation of copolymerizates, mixtures of the above mentioned monomers with each other or with other ethylenically unsaturated compounds, including those which are by themselves unpolymerizable or difficult to polymerize, such as maleic- and fumaric-acid esters or vinylethers such as vinylisobutylether, are polymerized.

Suitable catalysts for the emulsion polymerization of the ethylenically unsaturated monomers are the customary, water-soluble, free radical forming polymerization catalysts, namely, not only the inorganic peroxides such as hydrogen peroxide and per- compounds such as alkali metal persulfates and percarbonates, but also the organic peroxides of which the following are mentioned by way of example: dilauroylperoxide, dibenzoylperoxide, cumylhydroperoxide, dicumylperoxide or cyclohexanone hydroperoxide. Azo-compounds, such as azodiisobutyronitrile or -amide may also be used. Further suitable or water-soluble redox catalyst systems, possibly with addition of small amounts of heavy metal salts, for instance, 2,2′-dihydroxymaleic acid, ascorbic acid, acetylacetone or sodium hydrosulfite, formaldehydesulfoxylate or suitable amines, together with the above mentioned peroxides.

The polymerization catalysts are used in amounts which are customary for the polymerization of unsaturated monomers, that is, about 0.05 to 3% based on the weight of the monomeric compounds.

During the polymerization an acid pH range, preferably a pH of about 3 to 5, is maintained, if necessary by addition of known buffers. The polymerization temperature is, as a rule, about 20 to 100° C., preferably 50 to 100° C. If necessary, for instance in the polymerization of vinylchloride and vinylidenechloride, the polymerization is carried out under pressure. The water content of the finished polymerization dispersion is about 30% to 60%, preferably 40–50% by weight.

The following examples illustrate the practice of the invention, they are not, however, to be construed as limiting the same. It is obvious that other expedients known to those skilled in the art may be employed without departing from the invention.

EXAMPLE 1

(a) Preparation of the protective colloid solution 128 gm. of glycidyl acrylate were added dropwise and while stirring to a solution of 73 gm. of diethylamine in 20 gm. of water at 30–40° C., and the mixture was stirred at the same temperature until the test for epoxide oxygen in the solution was negative (about 4–5 hours). The solution was thereupon diluted to 6% with water, adjusted to a pH of 4 with acetic acid, and polymerized with 4.3 gm. of potassium persulfate at 90° C. (2 hours); the 6% protective colloid solution had a viscosity of 6.5 cp.

(b) Preparation of the dispersion 250 gm. of the above described protective colloid solution 1(a), 1.3 gm. of a cationic emulsifier (such as "Zephirol" or "Germocid") and 80 gm. of vinyl acetate were placed into a stirring vessel provided with a reflux cooler and the mixture was heated. When reflux began (65° C.) 0.5 gm. of potassium persulfate were added, whereupon the polymerization started after a few minutes. 170 gm. of vinyl acetate were allowed to flow into the mixture over the course of one hour at about 70° C. By addition of a further 0.3 gm. of potassium persulfate, dissolved in a small amount of water, the polymerization was brought to completion in customary fashion. A pasty, stable dispersion was obtained which could be diluted with water in any desired ratio.

EXAMPLE 2

(a) Preparation of the protective colloid solution

The preparation was carried out as in Example 1(a), but 142 gm. of glycidyl methacrylate and 105 gm. of diethanolamine were used. Instead of acetic acid, phosphoric acid was used for neutralization. Viscosity of the 6% protective colloid solution was 8.2 cp.

(b) Preparation of the dispersion

Using 200 gm. of the 6% protective colloid solution 2(a) prepared above and 1.3 gm. of a cationic emulsifier ("Germocid"), 250 gm. of vinyl acetate were polymerized with 0.6 gm. of potassium persulfate in the same manner as described in Example 1. A very highly viscous, pasty dispersion was obtained which had cationically charged particles with a diameter of about 2μ. The dispersion, which could be diluted with water in any desired ratio, remained completely unchanged even after 6 months of storage in contrast to a dispersion prepared in analogous fashion from polydiethylaminoethyl methacrylate as the protective colloid which was highly agglomerated or coagulated after only 2 months of storage.

EXAMPLE 3

125 gm. of the protective colloid solution obtained in Example 2(a), 100 gm. of water, 2.5 gm. of nonylphenylpolyethyleneglycolether (containing 23 mols of ethyleneoxide) and 1.3 gm. of a cationic emulsifier ("Zephirol") were placed in a polymerization vessel provided with a stirrer and the mixture was heated to 70° C. One-third of a monomer mixture formed from 188 gm. of vinyl acetate and 62 gm. of vinyl laurate, wherein 2 gm. of tertiary butylhydroperoxide were dissolved, was added thereto, the entire mixture was heated, and the polymerization was initiated by introducion of a predetermined portion of a solution of 1 gm. of formaldehydesulfoxylate in 25 gm. of water. The monomer mixture and the remainder of the sulfoxylate solution were added over a period of one hour in such a manner that the polymerization temperature remained at about 75° C. After total addition of the monomer the temperature rose to 92° C.

The 50% dispersion thus obtained had a viscosity of 29,600 cp. (measured in a Brookfield viscosimeter with a No. 4 stirrer rotating at the rate of 1 r.p.m.) and was highly pseudoplastic. The dilutibility and storage stability as well as the frost stability and pigment absorption property were excellent. Upon examination in a direct current, the charge of the particles was found to be cationic. The dispersion furnishes a clear, shiny film with very good water-resistance.

The films prepared from the above-described dispersion exhibited excellent adherence to glass. When a dilute dispersion prepared as above was added to a cellulose fiber slurry (ratio of fiber substance to resin=2:1) and the mixture was filtered, it was found that more than 95% of the resin had been adsorbed upon the fiber. In contrast thereto, if an anionic dispersion is used, the resin remains practically completely in the filtrate, and in the case of a nonionic dispersion about 60% of the resin remains in the filtrate.

EXAMPLE 4

120 gm. of the protective colloid solution of Example 2(a), 100 gm. of water, 8 gm. of nonylphenylpolyethyleneglycolether (23 mols ethyleneoxide), 1 gm. of a cation active emulsifier and 0.8 gm. of potassium persulfate were placed into a pressure vessel and, after removing the air, 80 gm. of vinyl acetate, 50 gm. of vinyl laurate and 70 gm. of vinyl chloride were introduced. The polymerization was carried out at 50° C. for 24 hours.

A medium dispersed stable dispersion of 51% solids content was obtained.

EXAMPLE 5

Analogous to Example 1(a), a protective colloid solution was prepared, but 128 gm. of glycidyl acrylate were reacted with 105 gm. of diethanolamine. Under the conditions described in Example 1(a), a copolymer was prepared from 75 parts of this monomer acidified with acetic acid and 25% of vinyl acetate, and the solution was adjusted to 6%.

Analogous to Example 2(b), a cationic polyvinylacetate dispersion was prepared, using 250 gm. of the above protective colloid solution. A highly pseudoplastic, stable dispersion was obtained.

EXAMPLE 6

75 gm. of a 10% polyvinylalchohol solution (degree of hydrolysis 88 mol percent), 50 gm. of the 6% protective colloid solution of Example 2(a), 215 gm. of nonylphenylpolyethyleneglycolether (with 15 mol ethyleneoxide), 1.3 gm. of cationic emulsifier (stearylamidopropyl-dimethyl-$\beta$-hydroxyethylammonium - dihydrogenphosphate—trademark "Catanac SP"), 0.2 ml. of tertiary-dodecylmercaptan, 1 ml. of tertiary-butyl hydroperoxide and 100 ml. of water were placed into a stirring vessel provided with a reflux cooler. After addition of 80 gm. of methyl acrylate the vessel was flushed with nitrogen and the contents were heated to 65° C. Polymerization was initiated by the addition of 5 ml. of a solution of 0.5 gm. of formaldehydesulfoxylate in 25 ml. of water. When the temperature of the reaction mixture had risen to 80° C., 170 gm. of additional methyl acrylate and the remaining amount of the sulfoxylate solution were added over a period of one hour in uniform portions. The final temperature was 96° C. The 50% dispersion thus obtained exhibited excellent stability.

EXAMPLE 7

(a) *Preparation of the protective colloid solution*

14.2 gm. of glycidyl methacrylate were added dropwise at 30–35° C. and while stirring to 10.5 gm. of diethanolamine which contained 0.25 ml. of water, and the mixture was stirred at the same temperature for an additional 12 hours. The product thus obtained was diluted to 10% with water, 6 gm. of acetic acid were added and, after addition of 1.5 gm. of potassium persulfate the mixture was polymerized for 6 hours at 70° C. Thereafter, 4 gm. of sodium hydroxide dissolved in 100 ml. of water were added to the polymer solution; the solution, which was slightly cloudy at this point, had a pH of 8. While stirring, 12.6 gm. of dimethylsulfate were then added dropwise at 25° C. over a period of 30 minutes. The solution of the quaternary cationic protective colloid thereby became clear again.

(b) *Preparation of the dispersion*

35 gm. of the above protective colloid solution, Example 7(a), together with 25 gm. of a 10% polyvinyl- alcohol solution, 2.6 gm. of a cationic emulsifier ("Germocid"), 15 gm. of nonylphenylpolyethyleneglycolether (10 mol ethyleneoxide), 1 ml. of t-butylhydroperoxide and 155 ml. of water, were placed into a stirring vessel provided with a reflux cooler. After addition of 85 gm. of vinyl acetate and flushing with nitrogen, the contents were heated to 65° C. The polymerization was initiated by adding about 3 ml. of a solution of 0.5 gm. of formaldehydesulfoxylate in 25 ml. of water. After the reaction mixture had reached a temperature of 75° C., 165 gm. of vinyl acetate and the remaining amount of the formaldehydesulfoxylate solution were added in uniform portions over a period of one hour. The final temperature was 90° C. After cooling, a 50% medium viscous, frost-stable dispersion was obtained which was very rapidly and completely absorbed on cellulose fibers.

The dispersions with 40–60% solids content prepared according to the present invention are of medium to high viscosity, generally highly pseudoplastic, and have a particle size of 1–5$\mu$. They are also very stable, that is, they can be particularly well pigmented, admixed with water in any desired ratio without agglomeration and exhibit an excellent storage stability. Because of the cationic charge of the particles, the resins have very good adherence properties on all negatively charged surfaces.

The preceding examples are given as illustrative of the invention but are not limiting in any respect. Such changes and modifications as would occur to one skilled in the art may be made without departing from the spirit of the invention or the scope ofthe appended claims.

We claim:
1. In the process of preparing a stable, cation-active polymer dispersion by the heating of a mixture of a monomer selected from the group consisting of ethylenically-unsaturated polymerizable compounds and mixtures thereof and water in the presence of a free-radical forming polymerization catalyst, a cationic dispersion agent and a protective colloid for a time sufficient to effect polymerization, the improvement which comprises utilizing, as said protective colloid, an aqueous solution of a water soluble salt of a polymer prepared from the reaction product of an amine of the formula

wherein $R_2$ and $R_3$ can be different and are selected from the group consisting of alkyl having from 1 to 18 carbon atoms, alkylol having from 2 to 6 carbon atoms, cycloalkyl having 6 to 18 carbon atoms and hydrocarbon aryl having from 6 to 18 carbon atoms, with the epoxide group of an unsaturated polymerizable epoxy compound, said polymerizable reaction product having the formula

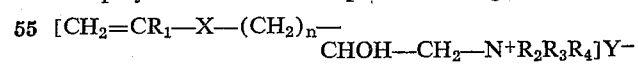

wherein $R_2$ and $R_3$ have the above-assigned values; $R_1$ is a member selected from the group consisting of hydrogen, lower alkyl and phenyl; $R_4$ is a member selected from the group consisting of hydrogen, lower alkyl and glycidyl; X is a linkage selected from the group consisting of —$CH_2$—, —O—,

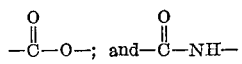

Y is an anion of an acid forming said water-soluble salt; and $n$ is an integer from 1 to 2.

2. In the process of preparing a stable, cation-active polymer dispersion by the heating of a mixture of a monomer selected from the group consisting of ethylenically-unsaturated polymerizable compounds and mixtures thereof and water in the presence of a free-radical forming polymerization catalyst, a cationic dispersion agent and a protective colloid for a time sufficient to effect polymerization, the improvement which comprises utilizing, as said protective colloid, an aqueous, acidic solution of a water-soluble salt of a polymer prepared from the reaction product of diethanolamine with the epoxide group of the glycidyl ester of acrylic acid, said polymerizable reaction product having the formula $$[CH_2=CH-\overset{O}{\overset{\|}{C}}-O-CH_2-CHOH-CH_2-\overset{+}{\underset{H}{N}}(CH_2-CH_2OH)_2]Y^-$$

wherein Y is an anion of an acid forming said water-soluble salt.

3. In the process of preparing a stable, cation-active polymer dispersion by the heating of a mixture of a monomer selected from the group consisting of ethylenically-unsaturated polymerizable compounds and mixtures thereof and water in the presence of a free-radical forming polymerization catalyst, a cationic dispersion agent and a protective colloid for a time sufficient to effect polymerization, the improvement which comprises utilizing, as said protective colloid, a neutral to acidic aqueous solution of a water soluble salt of a polymer prepared from the reaction product of an amine of the formula $$HN\begin{matrix}R_2\\\\R_3\end{matrix}$$

wherein $R_2$ and $R_3$ can be different and are selected from the group consisting of alkyl having from 1 to 18 carbon atoms, alkylol having from 2 to 6 carbon atoms, cycloalkyl having 6 to 18 carbon atoms and hydrocarbon aryl having from 6 to 18 carbon atoms, with the epoxide group of an unsaturated polymerizable epoxy compound, said polymerizable reaction product having the formula $$[CH_2=CR_1-X-(CH_2)_n-$$
$$CHOH-CH_2-N^+R_2R_3R_4]Y^-$$

wherein $R_2$ and $R_3$ have the above-assigned values; $R_1$ is a member selected from the group consisting of hydrogen, lower alkyl and phenyl; $R_4$ is a member selected from the group consisting of hydrogen, lower alkyl and glycidyl; X is a linkage selected from the group consisting of —CH$_2$—, —O—, $$-\overset{O}{\overset{\|}{C}}-O-; \text{ and } -\overset{O}{\overset{\|}{C}}-NH-$$

Y is an anion of an acid forming said water-soluble salt; and $n$ is an integer from 1 to 2.

4. In the process of preparing a stable, cation-active polymer dispersion by the heating of a mixture of a monomer selected from the group consisting of ethylenically-unsaturated polymerizable compounds and mixtures thereof and water in the presence of a free-radical forming polymerization catalyst, a cationic dispersion agent and a protective colloid for a time sufficient to effect polymerization, the improvement which comprises utilizing, as said protective colloid, an aqueous solution of a water soluble salt of a copolymer of a monomer prepared from the reaction product of an amine of the formula $$HN\begin{matrix}R_2\\\\R_3\end{matrix}$$

wherein $R_2$ and $R_3$ can be different and are selected from the group consisting of alkyl having from 1 to 18 carbon atoms, alkylol having from 2 to 6 carbon atoms, cycloalkyl having 6 to 18 carbon atoms and hydrocarbon aryl having from 6 to 18 carbon atoms, with the epoxide group of an unsaturated polymerizable epoxy compound, said polymerizable reaction product having the formula $$[CH_2=CR_1-X-(CH_2)_n-$$
$$CHOH-CH_2-N^+R_2R_3R_4]Y^-$$

wherein $R_2$ and $R_3$ have the above-assigned values; $R_1$ is a member selected from the group consisting of hydrogen, lower alkyl and phenyl; $R_4$ is a member selected from the group consisting of hydrogen, lower alkyl and glycidyl; X is a linkage selected from the group consisting of —CH$_2$—, —O—, $$-\overset{O}{\overset{\|}{C}}-O-; \text{ and } -\overset{O}{\overset{\|}{C}}-NH-$$

Y is an anion of an acid forming said water-soluble salt; and $n$ is an integer from 1 to 2 and up to 70% of a hydrophilic monomer.

5. In the process of preparing a stable, cation-active polymer disperison by the heating of a mixture of a monomer selected from the group consisting of ethylenically-unsaturated polymerizable compounds and mixtures thereof and water in the presence of a free-radical forming polymerization catalyst, a cationic dispersion agent and a protective colloid for a time sufficient to effect polymerization, the improvement which comprises utilizing, as said protective colloid, an aqueous solution of a water soluble salt of a copolymer of a monomer prepared from the reaction product of an amine of the formula $$HN\begin{matrix}R_2\\\\R_3\end{matrix}$$

wherein $R_2$ and $R_3$ can be different and are selected from the group consisting of alkyl having from 1 to 18 carbon atoms, alkylol having from 2 to 6 carbon atoms, cycloalkyl having 6 to 18 carbon atoms and hydrocarbon aryl having from 6 to 18 carbon atoms, with the epoxide group of an unsaturated polymerizable epoxy compound, said polymerizable reaction product having the formula $$[CH_2=CR_1-X-(CH_2)_n-$$
$$CHOH-CH_2-N^+R_2R_3R_4]Y^-$$

wherein $R_2$ and $R_3$ have the above-assigned values; $R_1$ is a member selected from the group consisting of hydrogen, lower alkyl and phenyl; $R_4$ is a member selected from the group consisting of hydrogen, lower alkyl and glycidyl; X is a linkage selected from the group consisting of —CH$_2$—, —O—, $$-\overset{O}{\overset{\|}{C}}-O-; \text{ and } -\overset{O}{\overset{\|}{C}}-NH-$$

Y is an anion of an acid forming said water-soluble salt; and $n$ is an integer from 1 to 2 and up to 30% of a lipophilic monomer.

6. In the process of preparing a stable, cation-active polymer dispersion by the heating of a mixture of a monomer selected from the group consisting of ethylenically-unsaturated polymerizable compounds and mixtures thereof and water in the presence of a free-radical forming polymerization catalyst, a cationic dispersion agent and a protective colloid for a time sufficient to effect polymerization, the improvement which comprises utilizing, as said protective colloid, an aqueous solution of a water-soluble quaternary ammonium salt of a polymer prepared from the reaction product of diethanolamine with the epoxide group of the glycidyl ester of methacrylic acid, said polymerizable reaction product having the formula $$[CH_2=\underset{CH_3}{\overset{}{C}}-\overset{O}{\overset{\|}{C}}-O-CH_2-CHOH-CH_2-\overset{+}{\underset{H}{N}}(CH_2-CH_2OH)_2]Y^-$$

wherein Y is an anion of an acid forming said water-soluble salt.

7. In the process of preparing a stable, cation-active polymer dispersion by the heating of a mixture of a monomer selected from the group consisting of ethylenically-unsaturated polymerizable compounds and mixtures thereof and water in the presence of a free-radical forming, water-soluble polymerization catalyst, a cationic dispersion agent, a non-ionic dispersion agent, a non-ionic protective colloid and a cationic protective colloid for a time sufficient to effect polymerization, the improvement which comprises utilizing, as said cationic protective colloid, a neutral to acidic solution of a water soluble salt of a polymer prepared from the reaction product of an amine of the formula

wherein $R_2$ and $R_3$ can be different and are selected from the group consisting of alkyl having from 1 to 18 carbon atoms, alkylol having from 2 to 6 carbon atoms, cycloalkyl having 6 to 18 carbon atoms and hydrocarbon aryl having from 6 to 18 carbon atoms, with the epoxide group of an unsaturated polymerizable epoxy compound, said polymerizable reaction product having the formula

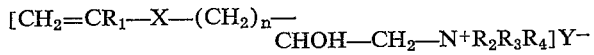

wherein $R_2$ and $R_3$ have the above-assigned values; $R_1$ is a member selected from the group consisting of hydrogen, lower alkyl and phenyl; $R_4$ is a member selected from the group consisting of hydrogen, lower alkyl and glycidyl; X is a linkage selected from the group consisting of $-CH_2-$, $-O-$,

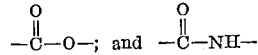

Y is an anion of an acid forming said water-soluble salt; and $n$ is an integer from 1 to 2.

8. In the process of preparing a stable, cation-active polymer dispersion by the heating of a mixture of a monomer selected from the group consisting of ethylenically unsaturated polymerizable compounds and mixtures thereof and water in the presence of a free-radical forming polymerization catalyst, a cationic dispersion agent and a protective colloid for a time sufficient to effect polymerization, the improvement which comprises utilizing, as said protective colloid, an aqueous, acidic solution of a water-soluble salt of a polymer prepared from the reaction product of diethanolamine with the epoxide group of the glycidyl ester of methacrylic acid, said polymerizable reaction product having the formula

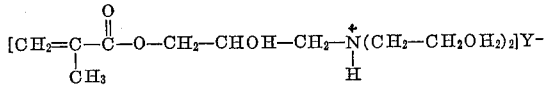

wherein Y is an anion of an acid forming said water-soluble salt.

References Cited by the Examiner

UNITED STATES PATENTS 2,781,335   2/1957   Cupery _____ 260—29.6
2,973,285   2/1961   Berke et al. _____ 260—29.6

OTHER REFERENCES

Schwartz et al. Surface Active Agents and Detergents, vol. II, 1958, Interscience Pub., N.Y., pp. 169.

MURRAY TILLMAN, *Primary Examiner.*

N. F. OBLON, *Assistant Examiner.*